July 21, 1964
M. A. ANDERSON
3,141,590
OVEN TRAY
Filed May 26, 1961
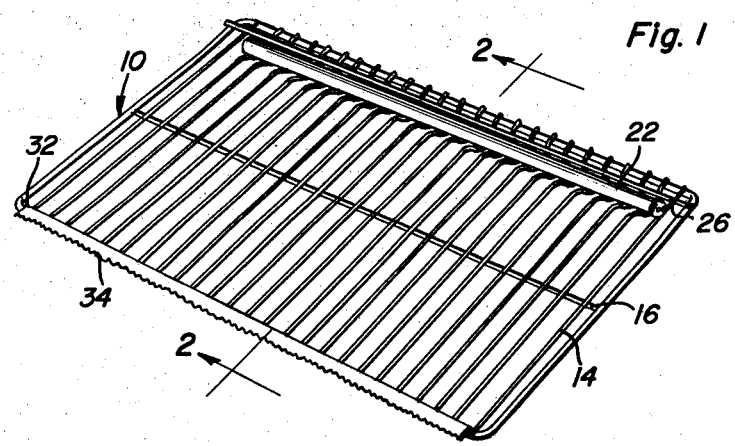
Fig. 1
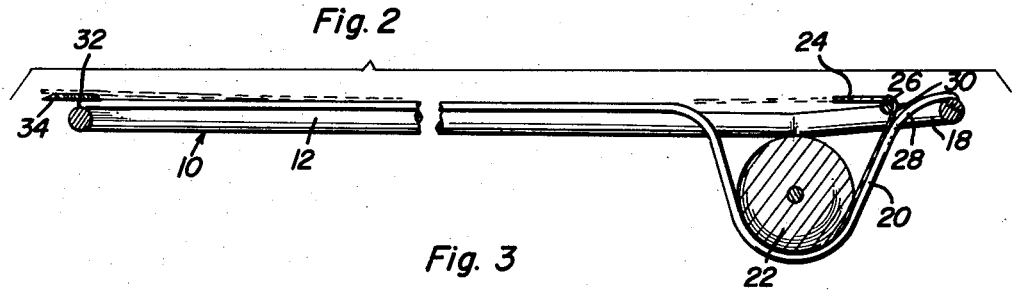
Fig. 2
Fig. 3
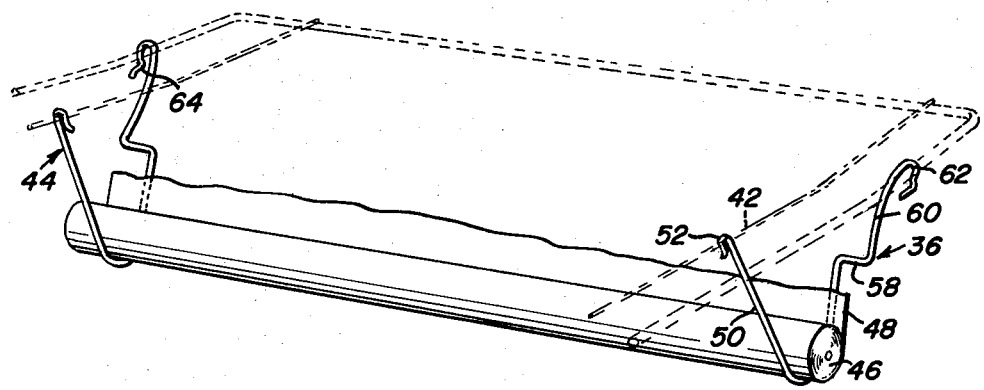
Fig. 4
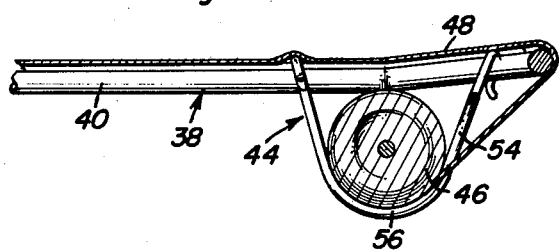
Marvin Andy Anderson
INVENTOR.
BY *Clarence A. O'Brien*
and *Harvey B. Jacobson*
Attorneys

United States Patent Office 3,141,590
Patented July 21, 1964

3,141,590
OVEN TRAY
Marvin Andy Anderson, 35 Kildare Ave., Joliet, Ill.
Filed May 26, 1961, Ser. No. 112,903
4 Claims. (Cl. 225—6)

The present invention generally relates to a tray construction and more particularly to a tray or grill employed for holding articles of food while being cooked together with an assembly for dispensing metallic foil such as aluminum foil from a supply roll adjacent one edge of the tray into a position overlying the tray for receiving the articles to be cooked together with means for easily severing an already used portion of the foil for effectively providing a clean unused portion of foil in overlying relation to the tray or grill.

In substantially all ovens, there is provided a multiple of trays or grills which are usually in the form of a rigid wire grid work on which articles of food may be placed while cooking. By employing the tray of the present invention, there is provided a dispenser assembly for metallic foil such as aluminum foil whereby the food placed on the tray actually engages the foil so that any food that boils over or otherwise is caused to discharge liquids or the like will discharge such material onto the foil rather than onto the oven. When the foil being used has become soiled or has become deteriorated for any reason, the free edge thereof may be grasped and the soiled portion pulled outwardly of the tray and easily severed therefrom due to the particular construction of the tray thus enabling the foil overlying the tray to be replaced. This device also facilitates the cooking of various articles directly on the tray and is especially useful in cooking or baking cookies, biscuits, breads or the like directly on the tray thus eliminating the use of extra baking pans. Further, when the oven is not in use, the tray of the present invention may be used as a dispenser for foil or similar material as may be needed in the kitchen by the housewife during her regular cooking and housekeeping chores whereby the foil may be used for any of its usual purposes such as wrapping food for placement in the refrigerator or the like.

The primary purpose of the present invention is to provide a dispenser assembly either permanent or detachably connected to an oven tray for holding a supply roll of aluminum foil or any other suitable foil material or the like whereby the material may be pulled into overlying relation to the tray for use in collecting any material that should overflow, spill over or burn when baking or cooking after which the used portion of the foil may be pulled outwardly and torn off and thrown away. Also, this change of the foil overlying the tray may be accomplished while the oven is still used for cooking purposes and the device may be effectively employed for cooking certain articles directly on the foil.

Another feature of the present invention is to provide a detachable unit adapted to be placed under a conventional oven tray already in use for purposes of holding a roll of aluminum foil or similar material adjacent one edge of the tray whereby such material may be dispensed into overlying relation to the tray.

Still another feature of the present invention is to provide a tray in accordance with the preceding objects which may be employed in an oven but which may also be effectively employed in combination with outdoor fireplaces, outdoor grills or the like so that outdoor cooking may be done on the foil rather than on the grill or tray so that when the cooking operation has been completed, it is only necessary to tear off the used portion of the foil and replace the used portion with a clean portion which has been unrolled from the supply roll.

Still another feature of the present invention is to provide a cooking tray with an aluminum foil dispenser incorporated therewith which is quite simple in construction, adapted for many uses, easy to use and quite inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the oven tray of the present invention with the dispenser structure incorporated therein;

FIGURE 2 is a transverse, sectional view taken substantially upon a plane passing along section line 2—2 of FIGURE 1 illustrating the details of construction of the invention;

FIGURE 3 is a perspective view illustrating an attachble assembly for existing trays, the tray being shown in dotted lines; and FIGURE 4 is a detailed sectional view illustrating the construction of the detachable form of the invention.

Referring now specifically to the drawings, the numeral 10 generally designates the tray construction of the present invention which includes a rigid open rectangular framework 12 preferably constructed of relatively heavy wire rod or the like. Extending parallel to the side edges of the frame 12 is a plurality of smaller wire rod members 14 and a single central wire rod support member 16 is provided in underlying relation to the wire rod members 14 and in perpendicular relation thereto thus forming a rigid tray or grill such as would normally be found in a stove oven and capable of being slidably inserted therein and removed therefrom. The frame 12 may be substantially straight or may have a slightly upwardly inclined rear portion 18 serving the purpose of retaining the tray in position in the usual horizontal trackways therefor.

Each of the smaller wire rod members 14 except the outermost end members 14 has a depressed U-shaped portion 20 adjacent one end thereof which is that end disposed adjacent the inclined portion 18 or the rear edge of the tray when inserted in an oven. The U-shaped depressions 20 are all in alignment and serve to form a longitudinally elongated pocket or recess for a supply roll of aluminum foil 22 or any other similar metallic foil or similar flexible material capable of use in substantially the same manner. When the roll of foil 22 is placed in the recess or pocket formed by the depressed portions 20, the top edge of the foil will be disposed below the plane of the upper surface of the members 14 and the foil sheet 24 extends upwardly from the bottom rear edge of the supply roll of foil 22 alongside the inner surface of the rearmost leg of the U-shaped depression 20. The foil sheet 24 then extends behind and over the top of a transverse guide rod 26 which is generally parallel to the member 16 and the rear portion of the frame 12 but is spaced slightly from the rearwardly curved upper portions of the U-shaped depressions as indicated by numeral 28 thus forming a slot 30 for passage of the aluminum foil sheet 24 so that it may be disposed in overlying relation to the pocket formed by the depressions 20 and also in overlying relation to the entire framework 12 including the small rods 14 except for the end rods 14 and the ends of the frame 12. The free edge of the aluminum foil sheet 24 is disposed at the forward edge of the tray 10 so that articles may be placed on the aluminum foil for cooking. Such articles may be placed directly on the foil or may be in a suitable cooking pan, container or the like.

At the forward edge of the frame 12, there is provided an elongated narrow plate 32 in the form of a cutter plate which has serrated teeth 34 along the outer edge thereof for purposes of severing the sheet of aluminum foil 24 when drawn downwardly thereover substantially in the nature of the tear-off bar employed in conjunction with conventional dispenser boxes for aluminum foil and similar sheet material. In severing the sheet of aluminum foil, the aluminum foil is drawn outwardly until the desired area thereof overlies the serrated teeth 34 on the strip 32 and then with a sharp and rapid downward movement, the sheet will be severed. If desired, the sheet may be prevented from additional longitudinal outward movement during the severing operation by placing pressure on the sheet inwardly of the cutter plate or bar 32.

In the form of the invention illustrated in FIGURES 3 and 4, a detachable assembly is provided generally designated by numeral 36 which is adapted to be connected to a conventional oven tray designated by numeral 38 such as are found in most conventional stoves. The conventional oven tray includes a peripheral rigid open frame 40 having a plurality of smaller wire rods 42 extending from the front to rear thereof. The attachment of the present invention includes a wire bracket generally designated by numeral 44 for supporting each end of a supply roll 46 of aluminum foil 48 or the like.

Each wire bracket 44 is generally U-shaped in configuration and includes a forward straight leg 50 disposed in upwardly and forwardly inclined position. The upper end of the leg 50 is provided with an inwardly projecting hook 52 which opens downwardly and which hooks over the outermost wire rod member 42. Each bracket 44 also includes a rear upwardly and rearwardly inclined leg 54. A generally semi-circular bight portion 56 interconnects the legs 50 and 54 and the semi-circular bight portion 56 rotatably supports the supply roll 46 of aluminum foil 48.

Intermediate the ends of the leg 54 and spaced below the tray 38, the leg 54 is provided with an outwardly offset portion 58 which is generally parallel to the longitudinal axis of the supply roll 46 and the outer end of the offset portion 58 is upwardly and rearwardly inclined as indicated by numeral 60 and terminates in a downwardly opening hook 62 which is facing outwardly as compared to the hook 52. The hook 62 is provided with an inwardly extending detent or projection 64 thereon which is for the purpose of snapping over the frame member 40 of the tray 38. The length of the offset 58 is generally equal to the distance between the frame 40 and the first wire rod member 42 so that the supply roll 46 may be supported and whereby the sheet of aluminum foil 48 may be passed upwardly and over the offset portion 58 and then around the rear edge of the frame 40 as illustrated in FIGURE 4 and the sheet 48 may then be disposed in overlying relation to the tray and also in overlying relation to the hook 52 of each of the brackets 44. Inasmuch as the aluminum foil 48 is retained in overlying relation to the offset portions 58, the offset portions 58 serve as a guide for the aluminum foil and conversely, the aluminum foil serves to retain the wire brackets 44 in spaced relation so that the lower ends thereof will not move inwardly. Generally, the weight of the supply roll 46 will retain the wire bracket in depending vertical relation to the tray 38. This form of the invention enables a conventional oven tray to be converted into a tray having an aluminum foil supply roll carried thereby so that the aluminum foil may be easily dispensed into overlying relation to the tray. In the form of the invention illustrated in FIGURES 3 and 4, the aluminum foil may be severed with a suitable instrument or the forward edge of the tray itself may be employed as a cutting bar or, if desired, a snap-on type of cutter bar may be provided for the forward edge of the tray.

In both forms of the invention, the device may be used in outdoor cooking as well as within the interior of an oven or the like and the device may be used as a cooky sheet for baking various pastry products or may be used for cooking various meats directly thereon or may be when cooking various articles in containers subject to boiling over thus precluding the discharge of materials into the interior of the oven and thus eliminating the necessity of subsequently cleaning the oven which usually requires extended effort and considerable time.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A tray for cooking purposes comprising a generally rectangular frame including a plurality of wire-like support members extending between and secured to the opposite longitudinal edges of the frame so as to present a generally flat food receiving surface, said members, at a point spaced slightly inward of one longitudinal edge of the frame, having aligned depressions therein forming an upwardly opening elongated recess for receiving and supporting a supply roll of sheet material below the food receiving surface, and a smooth elongated guide rod fixed to the frame above the support members and parallel to said one longitudinal edge between the recess and said one longitudinal edge, said rod being spaced upwardly from the support members so as to allow a passing of the sheet material therebetween upon a dispensing from the supply roll, and a subsequent reversal of the sheet material over the rod and into overlying relation to the recess and food receiving surface.

2. The structure of claim 1 wherein said tray is provided with a cutting bar along the longitudinal edge opposite from said one longitudinal edge, said cutting bar being outwardly directed relative to the tray.

3. A tray for cooking purposes comprising a generally rectangular frame including a plurality of wire-like support members extending between and secured to the opposite longitudinal edges of the frame so as to present a generally flat food receiving surface, and means for supporting a supply roll of sheet material below the tray and inwardly of one longitudinal edge of the frame for a dispensing of the sheet material from the roll, around said one longitudinal edge and into overlying relation to the food receiving surface, said means including a pair of brackets, one mounted on the tray adjacent each side edge thereof in dependent relation thereto, each bracket including a rounded roll receiving bight portion and a pair of legs diverging therefrom, the free end of each leg being reversely bent so as to form a hook for engagement with the tray for suspending the brackets therebeneath, said brackets being in vertical planes generally paralleling the side edges with one leg of each bracket being orientated closer to said one longitudinal edge then the other, said one leg having a lateral outwardly directed offset portion for receiving and guiding the edges of the sheet material as it is dispensed from the roll.

4. For use in suspending a supply roll of sheet material below a cooking tray, a pair of brackets, each bracket including a pair of diverging legs interconnected by a rounded bight portion, the outer end portions of each leg being reversely bent so as to form hooks portions for engagement with the tray in a manner so as to suspend the brackets therebelow, and a laterally offset portion midway along the length of one leg of each bracket for providing a guide means for the sheet material dispensed from the roll.

References Cited in the file of this patent
UNITED STATES PATENTS

| | | |
|---|---|---|
| 1,123,830 | Zincke et al. | Jan. 5, 1915 |
| 2,703,078 | Hammond | Mar. 1, 1955 |
| 2,803,242 | Hammond | Aug. 20, 1957 |
| 2,849,949 | Trachtman | Sept. 2, 1958 |